United States Patent

[11] 3,558,819

| [72] | Inventor | Mervin W. LaRue, Jr.<br>Barrington, Ill. |
|------|----------|------------------------------------------|
| [21] | Appl. No. | 681,134 |
| [22] | Filed | Nov. 7, 1967 |
| [45] | Patented | Jan. 26, 1971 |
| [73] | Assignee | Ampex Corporation<br>Redwood City, Calif.<br>a corporation of California |

[54] AUTOMATIC IRIS FOR A TELEVISION CAMERA
1 Claim, 6 Drawing Figs.

[52] U.S. Cl. ........................................ 178/7.92, 178/7.2
[51] Int. Cl. ........................................ H64n 5/19
[50] Field of Search ........................................ 95/64D; 178/7.2, 7.92, 7.2E

[56] References Cited
UNITED STATES PATENTS

| 2,421,476 | 6/1947 | Belar et al. | 178/7.2E |
| 3,198,883 | 8/1965 | Borberg et al. | 178/7.2E |
| 3,116,673 | 1/1964 | Bogopolsky | 95/64D |
| 3,377,427 | 4/1968 | Fischer | 178/7.92 |
| 3,150,581 | 9/1964 | Wilharm | 95/640 |

Primary Examiner—Robert L. Griffin
Assistant Examiner—Anthony H. Handal
Attorney—Anderson, Luedeka, Fitch, Even and Tabin ABSTRACT: The illustrated apparatus is adapted for controlling the amount of illumination impinging upon the light-sensitive element of a vidicon television camera tube. The apparatus includes a light-sensitive cell which is connected to the terminals of a rotary meter for controlling the opening of an iris and thereby the illumination impinging upon the light-sensitive element of the camera tube. The iris aperture is shaped to maintain the smallest opening possible consistent with adequate image contrast and the iris is further designed to completely interrupt the illumination striking the face of the vidicon tube under extreme luminance conditions.

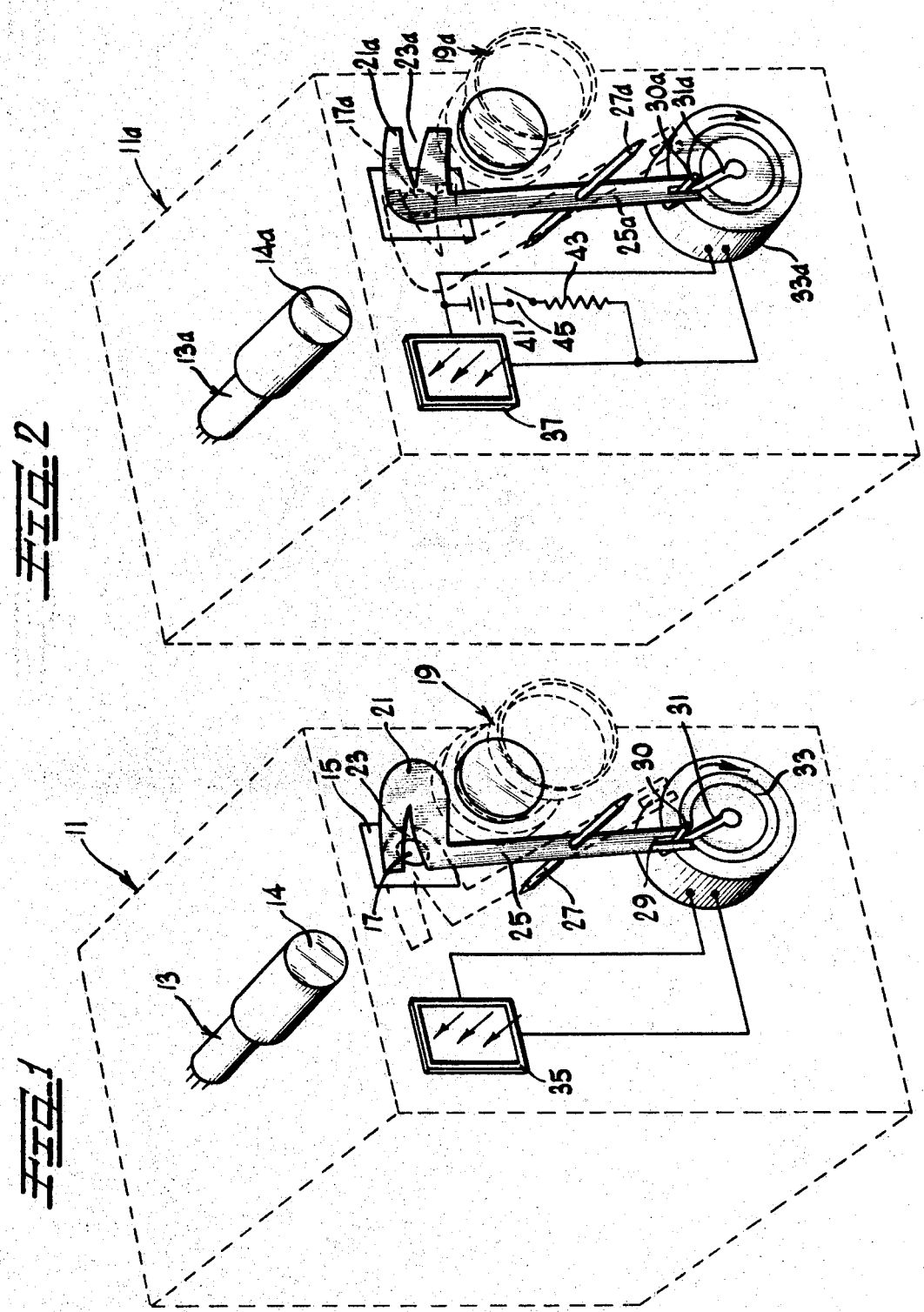

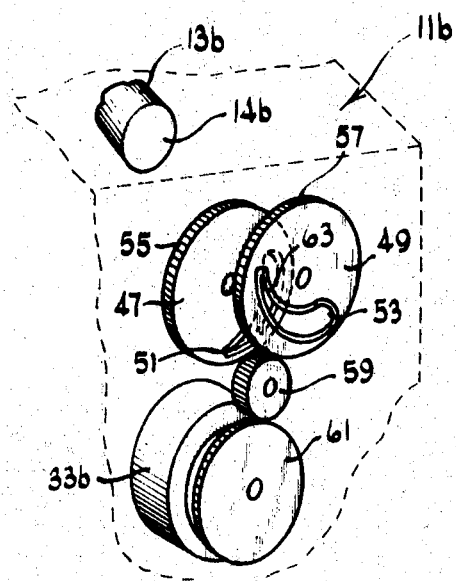

AUTOMATIC IRIS FOR A TELEVISION CAMERA

This invention generally relates to an iris control for a television camera and relates more particularly to an automatic iris for controlling illumination striking the face of a vidicon tube so as the optimize the depth of field consistent with picture contrast as well as to protect the tube from damage by excessive illumination.

Various manual and automatic devices for controlling the position of an iris so as to limit the amount of light passing through a lens system are relatively wee well known in connection with photographic cameras. Such devices generally include a photovoltaic cell the output voltage of which is used to control the opening of an adjustable iris aperture. The photovoltaic cell is directed towards the subject matter which is being photographed and the light reflected therefrom strikes the sensitive surface of the cell producing a voltage output which causes the iris to close in direct relation to the intensity of the reflected light. In situations of excessive brightness, the iris opening of a photographic camera is generally reduced to a $f$ number of 16 or 22, and is normally maintained at this setting for all luminous levels exceeding a fixed maximum value. Thus, once the smallest opening is obtained, the iris is not reduced even though overexposure to the film may and often does result. Further, is iris control systems used in conjunction with photographic cameras function in such a way as to cause the light falling upon the film to remain constant within the limits of manufacturing accuracy. For reasons to be subsequently described such automatic iris systems are generally, 2 unsuitable for use with television camera tubes.

While the following discussion and illustrated embodiment is directed towards a television camera including a vidicon picture tube, it should be understood that other types of camera tubes may be utilized without departing from the spirit and scope of this invention. Vidicon tubes are frequently used in connection with cameras incorporated in closed-circuit systems. Such tubes generally include a faceplate upon which is coated a photoconductive light-sensitive material, the resistance of which varies in proportion to the light impinging thereupon. Usually, such coating is in the form of a thin film of antimony trisulfide, of 30 candles per square foot. In the event the maximum figure is exceeded any appreciable extent, such as might occur if the camera is directed towards the sun, damage to the coating upon the face plate of the tube may result, resulting in a decrease in tube sensitivity and perhaps rendering portions of the faceplate entirely insensitive to light.

As previously mentioned, the extent to which the aperture is closed at maximum illumination levels in photographic cameras is usually limited to a minimum value. Such closure systems when used in combination with a television camera tube are generally unsatisfactory since, under certain high illumination conditions, damage to the camera tube may result. Further, such iris control systems are usually designed to cause the illumination falling upon the film to remain substantially constant. However, it is generally more desirable with respect to video cameras to keep the depth of field as large as possible by obtaining the largest $f$ number or smaller iris opening. At low illumination levels there is often a lack of adequate contrast and considerable lag. Both of these degradations decrease markedly when the illumination upon the faceplate is increased. Thus, it is further desirable to hold the iris fully open until adequate contrast is obtained and lag reduced to a satisfactory level and thereafter to maintain the opening as small as possible to obtain the greater possible depth of field.

An object of this invention is to provide an automatically adjustable iris for use with a television camera. A more particular object is to provide a lumination control device for a television camera which functions to control the amount of light impinging upon the faceplate of the camera tube therein so as to maintain maximum field depth consistent with image contrast. A still further object is to provide an automatic protective device for a limiting the maximum quantity of light which is allowed to pass through the lens of a television camera and onto the faceplate of the camera tube.

Other objects and advantages of this invention will become apparent through reference to the following description and accompanying drawings in which FIG. 1 is a schematic diagram of an automatic iris control mechanism including certain features of this invention in combination with a television camera;

FIG. 2 is a schematic diagram of an alternate embodiment of an apparatus including certain features of this invention;

FIG. 3 is a fragmentary schematic diagram of an automatic iris control apparatus incorporating rotary disc iris blades including certain features of this invention in combination with a television camera.

FIGS. 4 and 5 are enlarged fragmentary views of an iris aperture suitable for use with the apparatus of FIG. 3; and FIG. 6 is a graphical diagram illustrating the operative relationship of an alternate embodiment of this invention.

The embodiment illustrated in FIG. 1 is adapted fir for use with a television camera 11 which is generally indicated by a broke silhouette line. Mounted within the camera by suitable means (not shown) and spacially positioned rearwardly from the front wall of the camera is a vidicon tube 13 having a faceplate 14. The tube 13 may be the commercially available vidicon type and includes a target (not shown) in the form of a transparent signal electrode which is disposed internally, immediately adjacent the faceplate and wherein a layer of photoconductive material is disposed upon the signal electrode. The photoconductive layer is light-sensitive and exhibits a lower resistance when exposed upon to illumination thereby providing a resistive path which is directly proportional to the illumination impinging upon the face of the tube.

Aligned with the faceplate of the tube and secured to the front wall of the camera is an aperture frame 15 defining a circular aperture 17 wherethrough the image passes to the faceplate 14. Serving to direct the image upon the faceplate 14 is a lens combination 19. The lens combination 19 is adjusted so that the image focal plane thereof lies upon the faceplate 14 of the tube. Thus, in use, the television camera is directed towards the object to be viewed and the light reflected from the object is collected by the lens and projected through the aperture 17 onto the faceplate 14.

Serving to control the amount of light which passes through the aperture onto the faceplate of the tube, in a manner to be hereinafter more clearly described, is an iris 21 displayed a generally U-shaped configuration. A slot 23 in the iris 21, as illustrated in FIG. 1, is generally wedge-shaped and is positionable into alignment with the aperture 17. The iris is integrally secured to a support arm 25. Medially disposed through the arm 25 is an elongated pivot rod 27 secured in a suitable manner to the housing of the camera 11 and providing a fulcrum about which the arm 25 rotates. The pivot rod 27 is positioned and mounted within the camera so that, as previously mentioned, the wedge-shaped slot 23 of the iris 21 may be selectively positioned in alignment with the aperture 17 to control the quantity of light passing therethrough to the faceplate 14 of the tube 13. The remaining end of the support arm 25 is bifurcated as at 29 to receive a guide pin 30 secured to the free end of a meter pointer 31 forming a component of a meter 33.

The meter 33 is a conventional direct-current meter having a D'Arsonval or other suitable movement and is secured to the frame of the camera by appropriate means. The terminals of the meter 33 are connected to a photovoltaic cell 35 which serves to provide power thereto. The photovoltaic cell 35 is secured to the camera frontplate and positioned so that the sensitive surface thereof is directed towards the object being viewed by the camera tube 13. The area of the viewed object, reflecting light to the photovoltaic cell 35, is preferably at least 50 percent greater than the area of the object viewed by the vidicon tube 13 in all possible iris positions (i.e. the viewing area of the cell 35 encompasses the viewing area of the vidicon tube and each edge of the perimeter of the viewing area of the cell is spaced from the adjacent edge of the perimeter of the viewing area of the vidicon tube). This particular feature serves to assure that the protective device will function to obstruct the aperture 17 slightly before the vidicon tube faceplate is directed towards the excessively illuminated object as will be hereinafter further described.

During viewing of a dimly illuminated object, the quantity of light directed upon the sensitive surface of the photovoltaic cell 35 is relatively low thereby providing a minimum amount of current to the meter 33. Under such conditions, the meter vane 31 is in approximately its maximum counterclockwise position thereby deflecting the iris 21 to the "open" position illustrated in FIG. 1. In this maximum "open" position the iris affords a minimum amount of obstruction to the aperture 17 thereby providing the maximum exposure aperture. In this position, the greatest quantity of light is allowed to pass through the aperture 17 and onto the faceplate of the vidicon tube 13. As the light reflected from the object increases, a corresponding increase in the voltage output of the cell 35 is impressed upon the terminals of the meter 33 causing the pointer 31 thereof to move in a clockwise direction (as viewed in FIG. 1). The arm 25 is thus pivoted about the pivot rod 27 until, under excessive illumination conditions, the phantom position illustrated in FIG. 1 if obtained. In this position the solid portion of the iris 21 is positioned directly over the aperture 17 thereby totally obstructing the opening so as to prevent light from passing to the faceplate of the vidicon tube 13. The meter characteristics are preferably selected so that the aperture will be totally obstructed by the iris when the light sr striking the sensitive surface of the photovoltaic cell 35 is slightly less than the maximum brightness the tube 13 can safely accommodate or is slightly greater than the brightest possible scene to be viewed.

As previously mentioned, the photovoltaic cell views an area centered on and slightly larger than the area viewed by the faceplate 14 of the vidicon tube 13. This increases field of view insures the attainment of a relatively positive protective system. For example, when the camera axis is swung towards a highly illuminated object, such as the sun, the automatic iris control system will cause the iris to completely obstruct the aperture before the image of the sun is within the object range of the lens system 19. As previously mentioned, at such maximum illumination situations, the aperture is completely obstructed, whereas, in most conventional photographic protective systems, the aperture is allowed to remain at a minimum opening. Further, the embodiment illustrated, which includes a photovoltaic cell, provides the additional feature of allowing the protective device to be permanently connected in the circuit at all times thereby providing constant protection for the tube 13. If desired, the shape of the aperture may be designed to optimize the combination of picture contrast and depth of field as will hereinafter be described in connection with FIGS. 3 to 6.

Referring to FIG. 2, the embodiment illustrated therein provides an alternative system for energizing and thereby positioning the meter pointer. In the embodiment shown in FIG. 2, those elements which correspond with the elements of FIG. 1 are designated with the same reference numeral and the subscript a. The alternate embodiment includes a photoconductive cell 37 which is positioned in a similar manner to the photovoltaic cell 35 of FIG. 1. The surface of cell 37 is provided with a photosensitive coating, the resistance of which varies in an inverse relation to the amount of light impinging thereon. The photoconductive cell 37 is connected across the terminals of the meter 33a. Also, connected in parallel with the meter 33a terminals is a serially connected battery 41, resistor 43 and single-pole, single-throw switch 45. The switch 45 is preferably ganged with the camera on-off switch (not shown).

As the camera is switched on, current is caused to flow through the series resistor 43 and through the photoconductive cell 37. It is apparent that the voltage impressed across the meter terminals is directly proportional to the resistance of the cell 37. Under low illumination conditions, the resistance of the photoconductive cell 37 is relatively high thereby causing a relatively high voltage to be impressed across the meter terminals. The pointer 31a under such conditions is deflected in a clockwise direction (arrow) as viewed in FIG. 2. The iris 21a is reversed in FIG. 2, and therefore a clockwise rotations of the pointer 31a increases the area of the exposure slot 23a which is coincident with the aperture 17a thereby allowing a greater portion of the tube faceplate 14a to be exposed to the object being viewed. As the brightness of the object increases, the quantity of light impinging upon the sensitive coating of the photoconductive cell 37 increases thereby lowering the resistance of the cell. This lowered cell resistance results in a lowered voltage thereacross and correspondingly a lower voltage at the meter 33a terminals. This lower voltage impressed across the meter terminals causes the pointer 31a to deflect counterclockwise as viewed in FIG. 2. In the full counterclockwise position, as shown in solid lines, the iris 21a is caused to fully obstruct the aperture 17a thereby greatly decreasing the amount of illumination striking the faceplate 14a of the vidicon tube 13a.

Upon turnoff of the camera the switch 45 is simultaneously opened resulting in total deenergization of the meter. Deenergization of the meter allows the support arm 25a and the iris 21a to assume the solid line position thereby protecting the vidicon tube during periods of camera storage. The particular value of the series resistance, the type of photoconductive cell and the meter movement are selected so that the iris 21a will completely obstruct the aperture 17a when the object viewed by the camera reflects a luminance level slightly in excess of that which the camera can safely accommodate. Further, as mentioned in connection with the previous embodiment, the field of view of the photoconductive cell 37 is preferably selected to be slightly greater than the maximum field of view provided to the camera tube 13a. If desired, the shape of the aperture 17a may be designed to optimize the combination of picture contrast and depth of field in a manner similar to that which will be hereinafter described in connection with the embodiments illustrated in FIGS. 3, 4 and 5.

The embodiment of FIG. 3 includes an alternate form of an iris. In FIG. 3, those elements which correspond with the elements of FIG. 1 are designated with the same reference numeral and the subscript b. The iris of the embodiment of FIG. 3 comprises a pair of overlapping blades 47 and 49, each of which is shaped in the form of a disc. The iris blades 47 and 49 are respectively provided with similar teardrop shaped apertures 51 and 53 respectively, as will hereinafter be further described. The blades 47 and 49 include gear racks 55 and 57 formed in the peripheral edges thereof which are cooperable with and drivingly engaged by a drive gear 59 which is rotatably mounted upon the camera front plate The drive gear 59 is engaged with a drive gear 61 mounted upon the shaft of the meter 33b;

It will be noted that the apertures 51 and 53 are disposed in overlapping relationship with one another and the coincident portions of their areas define an exposure aperture 63 which is in alignment with the tube faceplate 14b through an opening (not shown). As a result of the shape of the apertures 51 and 53, rotation of the drive gear 61 turns the iris blades 47 and 49 thereby varying the area of the exposure aperture 63. Rotation of the drive motor 33b and thus the drive gear may be effected by either a photovoltaic cell as in FIG. 1, or by a photoconductive cell and associated circuitry similar to that illustrated in FIG. 2.

The geometric design of the apertures 51 and 53 is determined by the characteristics of the particular camera vidicon tube selected so as to provide optimum image quality. Referring to FIG. 4 an enlarged fragmentary view of the aperture 51 which is suitable for use with a conventional vidicon tube and for convenience of comparison, an aperture 65 of a conventional film camera aperture is illustrated in dotted outline. The other aperture 53 is similarly shaped. The conventional film camera aperture 65 is shaped to cause the illumination falling upon the film to remain constant within the limits of manufacturing accuracy. A curve 67 of FIG. 6 displays this relationship. The abscissa of the graph is designated in units of luminance and the ordinate in iris $f$ numbers from 2 to 22. At low levels of luminance the film camera aperture 65 is opened a maximum amount and proceeds to close uniformly after a predetermined luminance level (.2 candles /square foot in FIG. 6) is reached. The exposure aperture closes linearly with respect to luminance until a maximum limit (about 50 candles/square foot in FIG. 6) is obtained after which the exposure aperture remains at its minimum opening regardless of the subject luminance. As previously mentioned, maintenance of the exposure aperture at a minimum opening regardless of subject illuminance, while not damaging a camera film, may well result in damage to a vidicon tube. Further, a linear relation between subject luminance and aperture opening is not the most desirable relation for use with television camera tubes. With regard to a typical vidicon tube it is generally desirable to keep the depth of field as large as possible i.e. to use the largest $f$ number or smallest exposure aperture opening. As previously mentioned, at low illumination levels lack of adequate contrast and lag are serious problems. Both degradations decrease markedly when the illumination upon the faceplate of the tube is increased. It is thus desirable for the exposure aperture to remain fully open at low levels of luminance. The construction of the iris aperture 63 provides such a desired relationship and is illustrated in FIG. 6 by a curve 69. Upon reaching the maximum desired illumination level the coincident areas of the apertures is reduced to zero thereby preventing exposure of the camera tube to subject illumination levels in excess of about 800 candles per square foot.

The aperture illustrated in FIG. 4 generally provides such a desirable luminance vs. exposure aperture relationship. The aperture includes an enlarged, elongated substantially constant width eye 71 which extends a little less than approximately one-half of the iris aperture (i.e. at about 3 candles/square foot) and an elongated arcuately shaped tapered section 73. An arc line 75 is constructed by a radial line extending from the center axis of the iris disc 47 and is shown as a constructional line to facilitate an understanding of the present invention. It should be noted that both of the edges of the elongated eye 71 gradually merge into the edges of the taper 73 whereas the edges of the eye of the film camera aperture 65 abruptly join the edges of the taper so as to form the knee of the curve 67 at about 50 candles per square foot.

An alternate aperture 79 suitable for use with a vidicon camera tube is illustrated in FIG. 5 and provides the relationship illustrated by curve 81 of FIG. 6. In connection with certain types of vidicon camera tubes it is desirable to provide a relatively rapid aperture decrease during the early luminance levels and thereafter resume a gradual decrease again at higher luminance levels. The aperture 79 illustrated in FIG. 5 provides this desired relationship and includes an elongated constant width eye 83 which extends over approximately one-third of the iris opening. For purposes of discussion a construction line 85 similar to that of FIG. 4 is provided. The inner and outer edges of the eye 79 are approximately equally spaced from the construction line 85 and at about the one-third distance the inner and outer edges move outwardly from the construction line 85 to provide the bump in the curve 81, and then are gradually developed into a tapered section 87 as illustrated in FIG. 5.

Each of the iris blades 47 and 49 of the ii illustrated embodiment are provided with similar shaped apertures 51 and 53 and, as the blades are rotated, the exposure aperture 63 formed by the coincident areas of the apertures provides the desired luminance vs. $f$ number relationship. It should be understood that various aperture shapes may be selected to optimize the combination of maximum depth of field, minimum lag and maximum picture contrast for a selected vidicon tube characteristics without departing from the scope and spirit of this invention.

Although several embodiments of this invention have been herein shown and described, it should be understood that the construction shown may be altered without departing from the spirit and scope of the invention.

I claim:

1. In combination with a television camera which includes a front plate, a camera tube and a lens system for projecting a beam of light reflected from a viewed object upon the light-sensitive surface of said tube, an apparatus comprising a generally planar iris defining a aperture being selectively controlled and sized with respect to said light beam so as to control the quantity of light impinging the light-sensitive surface of said tube, actuating means coupled to said iris for controlling same with respect to said light beam, and a light-sensitive cell on said front plate and having an unobstructed view therefrom towards the objects being viewed, said light-sensitive surface of said camera tube having a predetermined area of view, said photosensitive cell having an area of view centered on and substantially larger than said camera tube predetermined area so that said photocell may anticipate said light-sensitive surface viewing a beam of light exceeding a predetermined level and cause said iris to be obstructed before said light-sensitive surface is damaged, said photosensitive cell being connected to said actuating means and controlling the size of said iris aperture and thereby regulating the quantity of illumination passing through said iris aperture and impinging upon the light-sensitive surface of said camera tube, said iris aperture providing an enlarged size opening for low levels of illumination and providing a nonlinear change in size of opening for intermediate levels of illumination, said iris being positionable in a covering and obstructing position to protect said light-sensitive surface at illumination levels above predetermined level, said nonlinear reduction in size of said iris providing a depth of field greater than that for a linear reduction in size of opening, said actuating means selectively controlling said iris to and from said covering and obstructing position and said open positions.